US008687825B2

(12) United States Patent
Okabayashi

(10) Patent No.: US 8,687,825 B2
(45) Date of Patent: Apr. 1, 2014

(54) DIGITAL MIXER

(75) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 277 days.

(21) Appl. No.: 12/875,009

(22) Filed: Sep. 2, 2010

(65) Prior Publication Data

US 2011/0058691 A1 Mar. 10, 2011

(30) Foreign Application Priority Data

Sep. 4, 2009 (JP) ................................ 2009-204858

(51) Int. Cl.
*H04B 1/00* (2006.01)
*H04B 1/20* (2006.01)

(52) U.S. Cl.
USPC ................................................ 381/119; 369/4

(58) Field of Classification Search
USPC ............ 381/119, 306, 118, 104, 109; 84/625, 84/660; 700/94; 345/1.1, 1.3, 173–175; 715/716–728
See application file for complete search history.

(56) References Cited

U.S. PATENT DOCUMENTS

2006/0045292 A1* 3/2006 Ando ........................... 381/119
2010/0239107 A1* 9/2010 Fujita et al. .................. 381/119
2010/0309153 A1* 12/2010 Terada ......................... 345/173

FOREIGN PATENT DOCUMENTS

JP 2006-067106 3/2006

OTHER PUBLICATIONS

Digital Mixing Console, M7CL Owner's Manual, 2005 Yamaha Corporation.

* cited by examiner

*Primary Examiner* — Vivian Chin
*Assistant Examiner* — Ammar Hamid
(74) *Attorney, Agent, or Firm* — Morrison & Foerster LLP

(57) ABSTRACT

Main and sub assignable controls are provided for each channel strip. Predetermined screens, each including a parameter display, are displayed dividedly or separately on first and second display devices. Thus, any one of a plurality of parameters included in the predetermined screen, being displayed on the first display device, is variably assigned to the main assignable control, while any one of a plurality of parameters included in the predetermined screen, being displayed on the second display device, is variably assigned to the sub assignable control. Further, when a predetermined pop-up screen, including at least a parameter display, is to be further displayed, in response to a screen display switching instruction, over the predetermined screen being displayed on the first display device, a parameter included in the pop-up screen is fixedly assigned to each of the main and sub assignable controls. In this way, the plurality of assignable controls can be used properly in accordance with a screen display.

14 Claims, 5 Drawing Sheets

DIGITAL MIXER

BACKGROUND

The present invention relates to digital mixers including a plurality of physical controls (so-called "assignable controls") to which are assignable desired parameters for control of the parameters, and more particularly to a technique for, in accordance with a screen display, differentiating a way of parameter assignment to the physical controls in such a manner as to permit efficient use of a plurality of physical controls.

As well known in the art, digital mixers are apparatus which generate mixed signals by outputting a plurality of digital audio signals, allotted to a plurality of predetermined input channels, to mixing buses with desired signal output levels, determined on a per-input-channel basis, and causing each of the mixing buses to mix together the digital audio signals at a mixing ratio corresponding to the channel-specific signal output levels. Among examples of the conventionally-known digital mixers is the digital mixer marketed by the assignee of the instant application under the product name "M7CL", which is disclosed in Patent Application Laid-open Publication No. 2006-67106 (hereinafter referred to as "the patent literature") or in "M7CL Instruction Manual", 2005, Yamaha Co., available on the Internet at http://www2.yamaha.co.jp/manual/pdf/pa/japan/mixers/m7cl_ja_om_e0.pdf.

The following describe a construction of an operation panel of the conventionally-known digital mixer disclosed in the patent literature. FIG. 6 is a conceptual diagram showing a schematic outer appearance the operation panel of the conventionally-known digital mixer. As shown, on the operation panel (also called "mixing console") Z of the conventionally-known digital mixer is provided, for each channel strip (eight channel strips are shown) corresponding to a user-desired input or output channel, a plurality of types of physical controls, including among other things a knob-type control N1-N8 (so-called "assignable control" and hereinafter referred to as "physical knob" for convenience of description) to which a user can assign a desired mixing-control related parameter (hereinafter referred to simply as "mixing parameter") and a fader control L1-L8 (that need not be an assignable control) for controlling predetermined a mixing parameter like a signal level. Also provided on the operation panel Z is a touch-panel type display 100 via which the user can perform desired input operation by touching a screen.

A GUI tool (i.e., display screen including parameter displays), displayed on the display device 100, is used for the user to assign mixing parameters to the individual physical knobs N1 to N8. For example, on the display device 100 of FIG. 6 is displayed, in a window format, a GUI tool comprising parameter assign screens C1 to C8 which are provided in corresponding relation to channel strips and each of which includes a plurality of control images KN (hereinafter referred to as virtual knobs). The user touches any one of the virtual knobs KN in the displayed parameter assign screens C1 to C8 on the display device 100, or positions a cursor K, displayed on the display screen, at any one of the virtual knobs KN, so that a predetermined mixing parameter associated in advance with the touched virtual knob KN or cursor-positioned virtual knob KN can be assigned to the physical knob of the corresponding channel strip (i.e., one of the knobs N1 to N8). After such assignment of parameters, the GUI tool comprising the parameter assign screens C1 to C8 can be used as-is, for example, when the user desires to confirm values of parameters set by the user operating the individual physical knobs N1 to N8.

However, with the conventionally-known digital mixer, where only one physical knob (N1-N8) is provided, as an assignable control, for each of the channel strips as shown in FIG. 6, only one parameter can be controlled for each of the channels. Thus, each time the user wants to perform control of a multiplicity of parameters in accordance with control to be performed (mixing or effect impartment), for example, the user has to change the assignment of parameters to the physical knobs N1 to N8 such as by selectively displaying, as necessary, either a mixing GUI tool or an effect-imparting GUI, each comprising the parameter assign screens C1 to C8, where different parameters are associated in advance with the plurality of control images KN. However, such parameter assignment change operation is very time-consuming and cumbersome, which would result in poor usability of the digital mixer.

As one approach for avoiding the aforementioned inconvenience, it is conceivable to provide, per each of the channel strips, one or more additional physical knobs (e.g. one or more sub physical knobs (not shown) in addition to the main physical knob N1-N8), and assign parameters to the individual sub physical knobs. In such a case, however, how to efficiently assign parameters to the main and sub physical knobs would become a concern. Namely, due to the limitations of the display device 100, it is difficult to simultaneously display a plurality of GUI tools, each comprising parameter assign screens C1 to C8, in correspondence with both the main physical knobs and the sub physical knobs. Thus, the user has no other choice than to perform mixing parameter assignment to each of the main or sub physical knobs while displaying the GUI tool for the main physical knobs or sub physical knobs. In such a case, it tends to be difficult for the user to grasp relationship between the main and sub physical knobs and the assigned parameters, and thus, the user cannot efficiently assign parameters. Also, it is difficult for the user to check parameter values set for individual ones of the main or sub physical knobs.

In the case where the sub physical knobs are provided in addition to the main physical knobs N1 to N8 as noted above, the user may naturally have a desire for efficiently using a multiplicity of the main and sub physical knobs, e.g. for efficiently setting effect-control-related parameters (hereinafter referred to as "effect parameters") etc. as well as for setting the above-mentioned mixing parameters using simultaneously both the main physical knobs and the sub physical knobs. However, the conventionally-known digital mixer is of course not arranged to allow the plurality of physical knobs to be used properly in accordance with a screen display (namely, types of parameters to be assigned etc.).

SUMMARY OF THE INVENTION

In view of the foregoing, it is an object of the present invention to provide an improved digital mixer which has excellent usability by being provided with not only a main physical control but also one or more sub physical controls per channel strip and by allowing the physical controls to be properly used efficiently in accordance with a screen display.

In order to accomplish the above-mentioned object, the present invention provides an improved digital mixer for performing control on signals input for a plurality of channels and mixing the signals of desired ones of the channels to generate a mixed signal, which comprises: at least one main physical control and at least one sub physical control provided for each individual one of the plurality of channels, a desired parameter being assignable to each of the physical controls for controlling the signal of the channel associated with the physical control; a first display device; a second display device; an instruction section which instructs switching between screen displays; a display control section which, in response to an instruction for switching between screen displays (i.e., screen display switching instruction) given from the instruction section, performs any one of first display control for displaying a predetermined screen, including at least parameter displays, on each of the first and second display devices and second display control for further displaying a predetermined pop-up screen, including at least a parameter display, over the predetermined screen being displayed on the first display device; and a parameter assignment section which, when the pop-up screen is not displayed on the first display device, not only variably assigns any one of a plurality of parameters included in the predetermined screen, being displayed on the first display device, to the main physical control but also variably assigns any one of a plurality of parameters included in the predetermined screen, being displayed on the second display device, to the sub physical control, and which, when the pop-up screen is displayed on the first display device, fixedly assigns a parameter included in the pop-up screen to each of the main and sub physical controls.

The digital mixer of the present invention includes a plurality of assignable controls, such as the main and sub physical controls, for each of the channel strips, and it displays the predetermined screens, each including at least a parameter display, dividedly on the first and second display devices. Thus, the parameter assignment section variably assigns any one of a plurality of parameters included in the predetermined screen, being displayed on the first display device, to the main physical control but also variably assigns any one of a plurality of parameters included in the predetermined screen, being displayed on the second display device, to the sub physical control. Thus, the main physical control can be used as an assignable control which is promptly assignable to a user-desired parameter to change the previous parameter assignment thereto at a user-desired time as with the conventional assignable control, while the sub physical control can be used as an assignable control which is assignable to a parameter that is preferably preset in some case although it need not be promptly assigned to the parameter to change the previous assignment. In this way, the present invention allows the main and sub physical controls to be used properly. Further, when the predetermined pop-up screen, including at least a parameter display, is to be further displayed, in response to a screen display switching instruction given from the instruction section, over the predetermined screen being displayed on the first display device, a parameter included in the pop-up screen is fixedly assigned to each of the main and sub physical controls. In this way, the present invention allows the main and sub controls to be used in a way different from the aforementioned, e.g., allows the main and sub controls to be used as controls for which parameters assigned thereto cannot be changed as needed. As a result, the present invention allows the plurality of physical controls to be used properly in accordance with a screen display.

Namely, according to the present invention, at least one sub physical control as well as the main physical control are provided as assignable controls per each of the channel strips, and parameters can be efficiently assigned to individual ones of the main and sub physical controls in accordance with user's operation. Also, the main physical control can be used as a control for which the parameter assigned thereto is frequently changeable to another parameter in accordance with user's parameter assignment operation. Further, the physical controls can be used either in a first way of use where the sub physical control is used as a control for which parameter assignment thereto need not be changed frequently or in a second of use where both of the main and sub physical controls are used as controls for which parameter assignment cannot be changed as needed. With such arrangements, the present invention can advantageously provide an improved digital mixer which has excellent usability.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
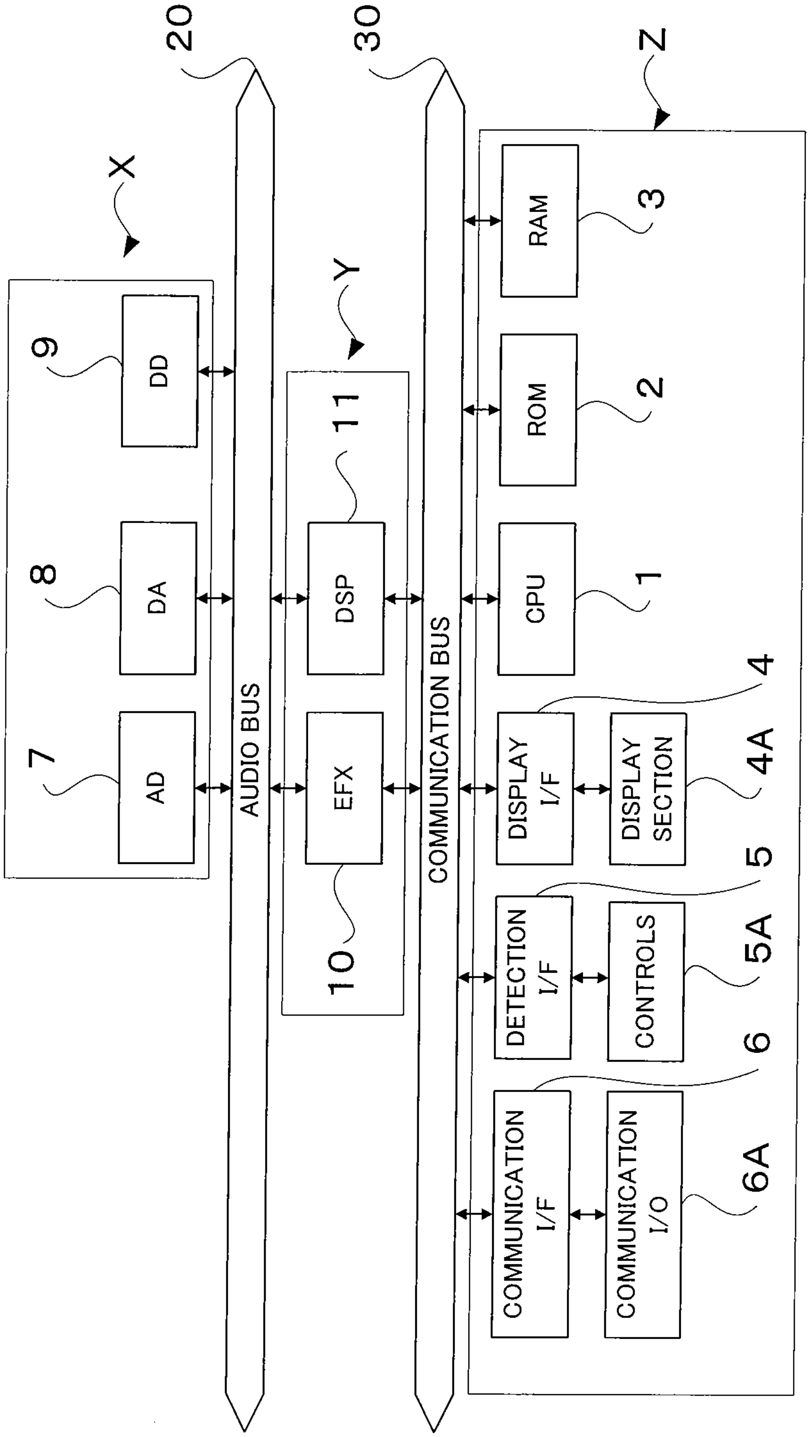
FIG. 1 is a hardware block diagram showing an example general hardware setup of a digital mixer according to an embodiment of the present invention.

FIG. 1 is a hardware block diagram showing an example general hardware setup of a digital mixer according to an embodiment of the present invention. The digital mixer shown in FIG. 1 includes: an operation panel (mixing console) Z for controlling the entire mixer on the basis of operation by a human operator or user; a signal input/output device X capable of inputting and outputting audio signals of a plurality of channels; and a signal processing engine Y for performing mixing control, effect control, etc. on the audio signals. These operation panel A, signal input/output device X and signal processing engine Y are interconnected via a data and communication bus 30 and/or an audio bus 20 for communication thereamong of remote-controlling control data and digital audio signals. Note that each of the signal input/output device X and signal processing engine Y may include a respective control section having a CPU and memory, a simple user interface, etc.

In the instant embodiment of the digital mixer including the operation panel Z, signal input/output device X and signal processing engine Y, signal control processing, such as mixing control, effect control etc., which is to be performed on audio signals is implemented by digital signal processing. By employing a mixing system configuration where each of the operation panel Z, signal input/output device X and signal processing engine Y is an independent device, the digital mixer of the present invention can provide a mixer of an extremely great scale (i.e., having a great number of channels).

The operation panel Z is a sound mixing console which includes a plurality of channel strips corresponding to a plurality of channels and which is capable of receiving, for each of the channel strips, a parameter change instruction given by the human operator.

The operation panel Z includes: a control section comprising a CPU 1, ROM 2 and RAM 3; a display interface (I/F) 4; a detection interface (I/F) 5; and a communication interface (I/F) 6, and these components are interconnected via the data and communication bus 30.

The CPU 1 executes control programs, stored in the ROM 2 or RAM 3, to control overall operation of the entire operation panel Z. Further, a current memory storing therein a current configuration and current operating states of the mixer is provided in the ROM 2, and the other devices (i.e., signal input/output device X and signal processing engine Y) can be controlled from the operation panel Z on the basis of stored content of the current memory.

The display interface (I/F) 4 displays various screens and various information on a display section 4A, which is for example in the form of a liquid crystal display (LCD) panel, on the basis of display control signals given from the CPU 1 via the data and communication bus 30. In the instant embodiment, the display section 4A includes two display devices, i.e. main and sub display devices 100 and 200. On these display devices 100 and 200 can be displayed not only various screens (GUI tools), such as later-described "parameter assign screens" (FIG. 2) and "effect screens" (FIGS. 3 and 4), but also various data stored in the ROM 2 and the like, controlling states of the CPU 1, etc. Using the above-mentioned screens displayed on the display section 4A, the human operator can make settings of various functions, such as a parameter assign function, mixing control function and effect control function, etc. Note that the display section 4A may be of a touch(-sensitive) panel type.

Controls 5A are provided on the operation panel Z and include a plurality of assignable controls provided in corresponding to the plurality of channel strips, as will be described later with reference to FIG. 2. The detection interface (I/F) 5 detects operation of the controls 5A to generate detection outputs.

The communication interface (I/F) 6 is an interface for communicating various information, such as control programs and audio signals, between the operation panel Z and a communication input/output device (communication I/O) 6A. The communication interface 6 may be a MIDI interface, LAN, Internet, telephone line network or the like. It should be appreciated that the communication interface 6 may be of either or both of wired and wireless types.

The signal input/output device X includes one or more analog audio signal input terminals (AD) 7, one or more analog audio signal output terminals (DA) 8, and one or more digital audio terminals (DD) 9. The signal input/output device X has: a function of an analog input section for converting an analog audio signal, input from each of the input terminals, to a digital audio signal and supplying the converted digital signal to the signal processing engine Y; a function of an analog output section for converting digital audio signals, supplied from the signal processing engine Y, to analog audio signals and supplying the converted analog audio signals to individual output terminals; a function of a digital input/output section for inputting and outputting digital audio signals via the digital audio terminals 9. Audio signals input from input sources (not shown) connected to the individual input terminals possessed by the signal input/output device X are supplied to the signal processing engine Y via the signal input/output device X. Further, a plurality of audio signals output from the signal processing engine Y are supplied, via the signal input/output device X, to output destinations connected to the individual output terminals possessed by the signal input/output device X.

The input sources are some forms of devices, such as a microphone and audio signal reproduction (replay) device, which supply audio signals to the instant embodiment of the mixer. Examples of the input sources may be independent input sources each for supplying an audio signal of one channel, a set of two input sources for supplying stereo signals of two channels, a set of a predetermined number of input sources for supplying surround signals of the predetermined number of channels (e.g., 5.1 Ch surround signals comprising audio signals of six channels), and/or the like. The output sources are some forms of devices, such as a sound system comprising amplifiers and speakers, audio recorder, and/or the like, which supply audio signals output from the instant embodiment of the digital mixer. For example, where stereo signals are to be output stereophonically, or where surround signals are to be output in a surround manner, a set of audio signals are supplied to a plurality of output destinations corresponding to the number of channels of the audio signals.

The signal processing engine Y includes an effecter control section (EFX) 10 and a mixing control section (DSP) 11, and each of these control sections executes microprograms. The microprograms are designed to perform, on the basis of control information (more specifically, mixing parameters, effect parameters, etc.) given from the operation panel Z, signal control processing, such as mixing control processing, effect control processing, etc., on a plurality of digital audio signals supplied from the signal input/output device X. The digital audio signals, having been subjected to the signal control processing, are output to the signal input/output device X. Here, the signal control processing (microprograms) executed by the effecter control section (EFX) 10 and mixing control section (DSP) 11 may be any conventionally-known processing (microprograms) and thus will not be described.

Figure 2:
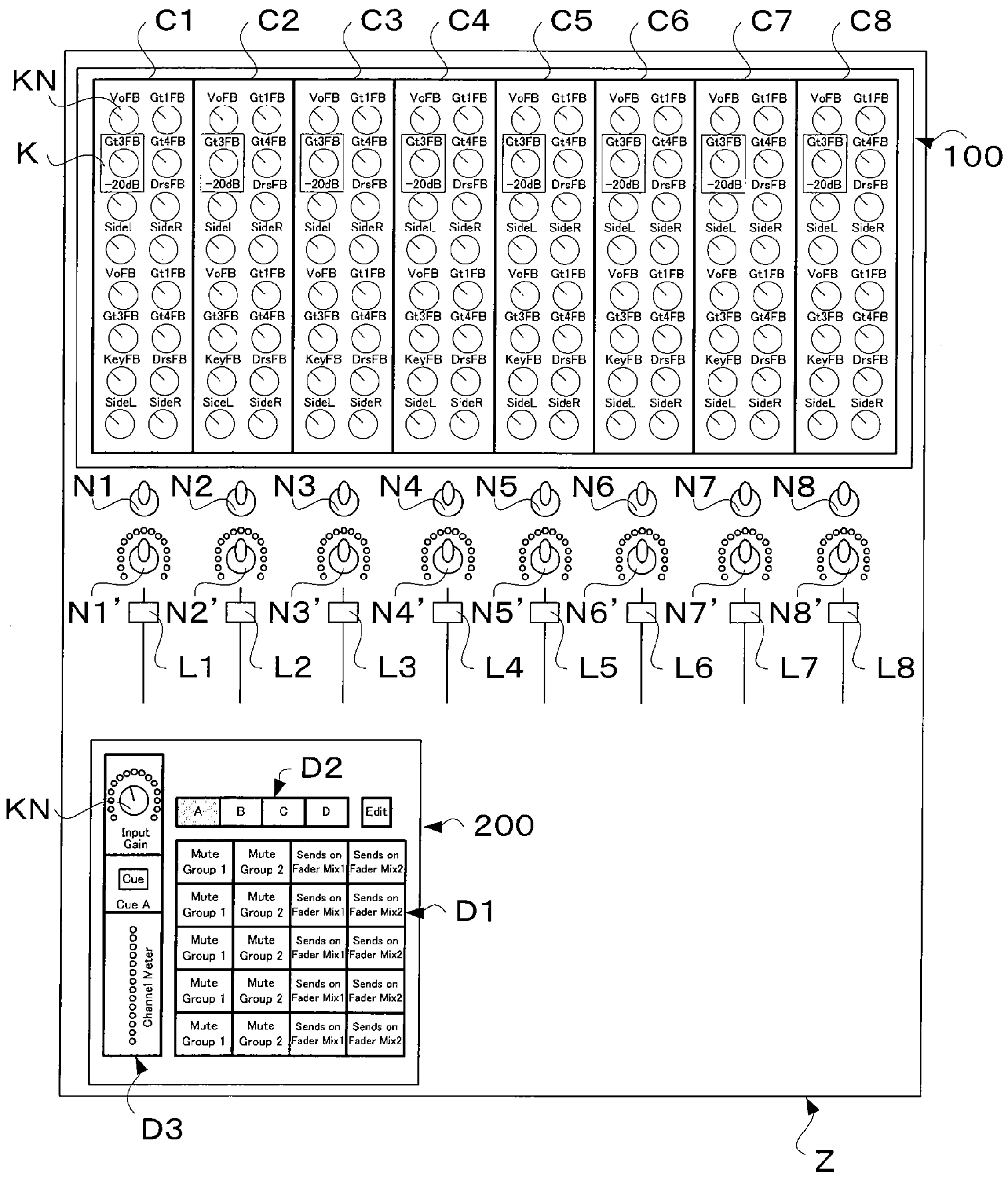
FIG. 2 is a conceptual diagram showing an example outer appearance of an operation panel of the digital mixer.

With reference to FIG. 2, the following describe an outer appearance of the operation panel Z of the instant embodiment of the digital mixer. FIG. 2 is a conceptual diagram showing an example outer appearance of the operation panel Z of the instant embodiment of the digital mixer. The operation panel Z shown in FIG. 2 is different from the conventional operation panel shown in FIG. 6 in that it not only includes a plurality of additional physical knobs N1' to N8' but also includes, in addition to the display device 100, the display device 200 of a touch panel type via which the human operator can make desired inputs by touching a screen.

Figure 6:
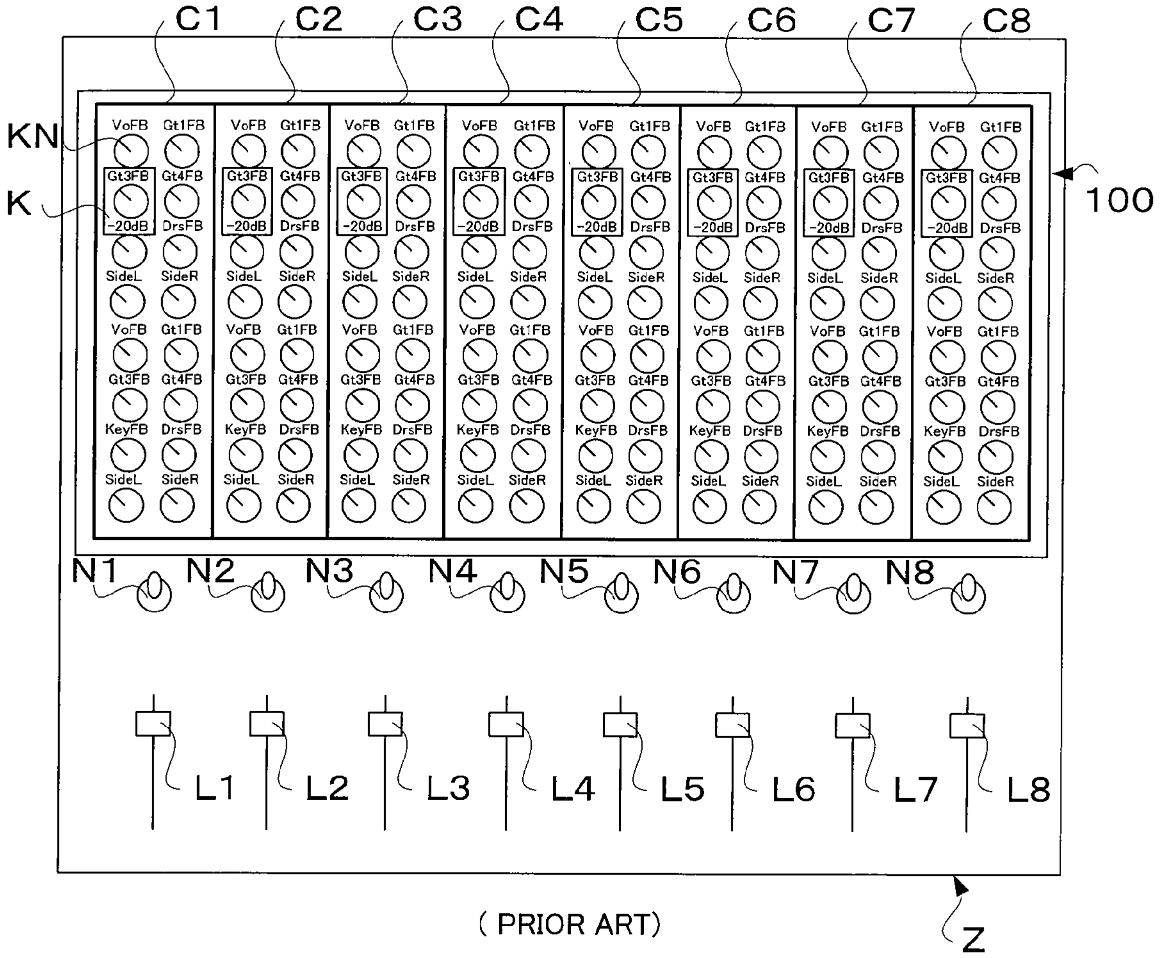
FIG. 6 is a conceptual diagram showing a schematic outer appearance of an operation panel of a conventionally-known digital mixer.

Similarly to a plurality of physical knobs N1 to N8 provided in corresponding relation to the channel strips, the additional physical knobs N1' to N8' are assignable controls to which the human operator or user can assign desired objects of control, and the additional physical knobs N1' to N8' are associated with the physical knobs N1 to N8 and located immediately below the corresponding physical knobs N1 to N8. Here, the plurality of physical knobs N1 to N8 can be used as main controls, while the plurality of additional physical knobs N1' to N8' located below the physical knobs N1 to N8 can be used as sub controls. Other structural elements similar to those shown in FIG. 6 are not described here to avoid unnecessary duplication.

As noted above in relation to the relevant prior art, parameter assignment to the main controls N1 to N8 is performed using parameter assign screens C1 to C8 (hereinafter referred to as “ordinary screen” for convenience of description) displayed on the display device (first display device) 100. However, parameter assignment to the sub controls N1' to N8' is performed using a parameter assign screen that is a GUI tool (i.e., screen including parameter displays) displayed on the display device (second display device) 200. Thus, the following describe an example manner in which parameters are assigned to the sub controls N1' to N8'.

Namely, the parameter assignment to the sub controls N1' to N8' is performed using the “parameter assign screen” displayed on the display device 200, rather than the parameter assign screens C1 to C8 displayed on the display device 100. Via the parameter assign screen displayed on the display device 200, the user or human operator can individually assign a parameter to a selected one of the sub controls N1' to N8', or collectively assign a same parameter to all of the sub controls N1' to N8'. As shown in FIG. 2, the parameter assign screen displayed on the display device 200 includes three major areas: a selection area D1 for displaying a plurality of assignable parameters; a bank area D2 for selecting a bank storing a multiplicity of parameters to be displayed in the selection area D1; and a display area D3 for displaying a single control image KN simulating one of the sub controls N1' to N8' and information (e.g., parameter value) of the assigned parameter.

The user selects any one of a plurality of banks (four banks in the illustrated example) via the bank area D2 and thereby causes a group of parameters, including a user-desired parameter, to be displayed in the selection area D1. Then, once the user selects the user-desired parameter, from among the group of parameters displayed in the selection area D1, such as by touching the user-desired parameter, the selected parameter is assigned to any one of the sub controls N1' to N8' selected in advance or to all of the sub controls N1' to N8'. In response to the assignment of the selected parameter, information pertaining to the assigned selected parameter is displayed in the display area D3 in a predetermined display style associated with the selected parameter. Needless to say, in response to the user operating any of the sub controls N1' to N8' having parameters assigned thereto, the control image KN and information pertaining to the assigned parameter displayed in the display area D3 can be updated, and thus, the user can check or confirm a current value etc. of the parameter.

Namely, in instant embodiment of the digital mixer of the present invention, a plurality of the assignable physical knobs, i.e. the main controls N1-N8 and the sub controls N1' to N8', are provided for each of the channel strips, and separate parameter screens are displayed dividedly on the first display device 100 and second display device 200. Thus, the user can properly use each of the main controls N1 to N8 as an assignable control which can be promptly assigned to a user-desired parameter for desired parameter assignment change at a user-desired time, and use each of the additional, sub controls N1' to N8' as an assignable control which may be assigned, as necessary, to a preset parameter without being promptly assigned to a parameter for desired parameter assignment change. Namely, the instant embodiment of the digital mixer allows the user to perform control on an increased number of parameters, by pre-assigning more parameters to the physical controls as compared to the conventionally-known digital mixer. Further, even when the user wants to change a variety of parameters in turns, for example, the instant embodiment of the digital mixer allows the user to perform parameter assignment operation without involving complicated operation, which achieves an improved usability of the digital mixer.

Like the conventionally-known digital mixer, the digital mixer is constructed to permit setting of not only the mixing parameters but also effect parameters by use of the physical knobs (assignable controls). When an effect parameter is to be assigned to a physical knob, the user selects an effect type to be controlled, and a dedicated effect screen for assigning an effect parameter is pop-up displayed over the assign screens C1 to C8. The following describe effect parameter assignment using the effect screen.

Figure 3:
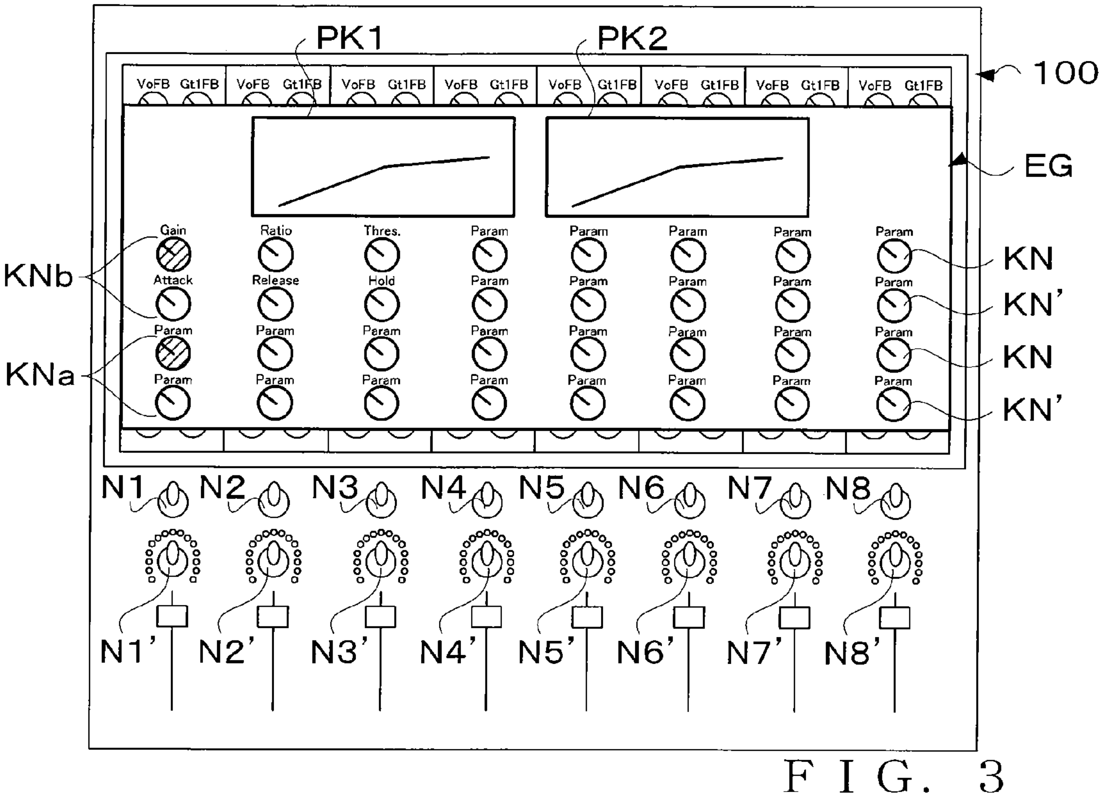
FIG. 3 is a conceptual diagram showing an example of an effect screen displayed in the embodiment of the present invention.

FIG. 3 is a conceptual diagram showing an example of the effect screen. The effect screen EG shown in FIG. 3 is of the conventionally-known display type (hereinafter referred to as “generic display type”). Because a plurality of physical knobs are provided for each of the channel strips in the instant embodiment, displays different from those in the conventionally-known digital mixer are made in the instant embodiment of the digital mixer. Namely, in the effect screen EG shown in FIG. 3, control images KN' simulating the sub controls N1' to N8' are added; note that such control images KN' are not displayed in the conventionally-known digital mixer.

On the effect screen EG shown in FIG. 3, two control groups KNa and KNb, comprising control images KN and KN' simulating at least the main controls N1 to N8 and sub controls N1' to N8', are displayed in two (i.e., upper and lower horizontal) rows in the same positional arrangement as the corresponding physical knobs. Predetermined effect parameters are associated in advance with the control images KN included in each of the control groups KNa and KNb on the basis of an assign table (not shown) having stored therein the controls and parameters in association with each other. Thus, by selecting any one of the control groups KNa and KNb, the user can assign the effect parameters, associated in advance with the control images KN and KN' included in the selected control group KNa or KNb, to the corresponding main controls N1 to N8 and sub controls N1' to N8'.

Namely, by selecting any one of the control groups KNa and KNb, the user can assign parameters to all of the main controls N1 to N8 and sub controls N1' to N8' included in the selected control group KNa or KNb in a collective fashion (i.e., through one selection operation). Note that the association or correspondence between the controls and the effect parameters on the effect screen EG is fixed, so that the user cannot individually change the assignment, to any one of the controls, of the parameter via the effect screen EG. Because the control imagers KN are displayed on the effect screen EG in the same positional arrangement as the main controls N1 to N8 and sub controls N1' to N8', the user can easily make parameter settings while visually checking or confirming positional relationship between the control images displayed on the screen EG and the physical knobs to be actually operated.

In addition to the aforementioned control images KN and KN’, various pieces of information (e.g., signal waveforms and the like), which would be influenced by parameters controlled through operation of the physical knobs corresponding to the control images KN and KN', may be displayed on the effect screen EG either dividedly in areas PK1 and PK2 corresponding to the upper-row control groups KNb and lower-row control group KNa or undividedly (not shown). In the case where the pieces of information (e.g., signal waveforms and the like) displayed on the effect screen EG dividedly in the areas PK1 and PK2, and when the user has selected any one of the control groups KNa and KNb to collectively change or switch the parameter assignment to the physical knobs, the user can intercompare the information influenced by the changed parameters, which is very convenient.

Further, in the instant embodiment of the invention, another effect screen of a different type from the aforementioned effect screen EG (FIG. 3) is selectively displayed, in order to allow the user to even more easily assign effect parameters to the physical knobs. Namely, by the user selecting a display type as well as an effect type to be controlled, the user can perform parameter assignment while properly using the effect screen of the display type shown in FIG. 3 and the effect screen of the display type shown in FIG. 4 (this display type will hereinafter be referred to also as “custom display type”). The following describe parameter assignment using the effect screen of the different display type from the display type shown in FIG. 3.

Figure 4:
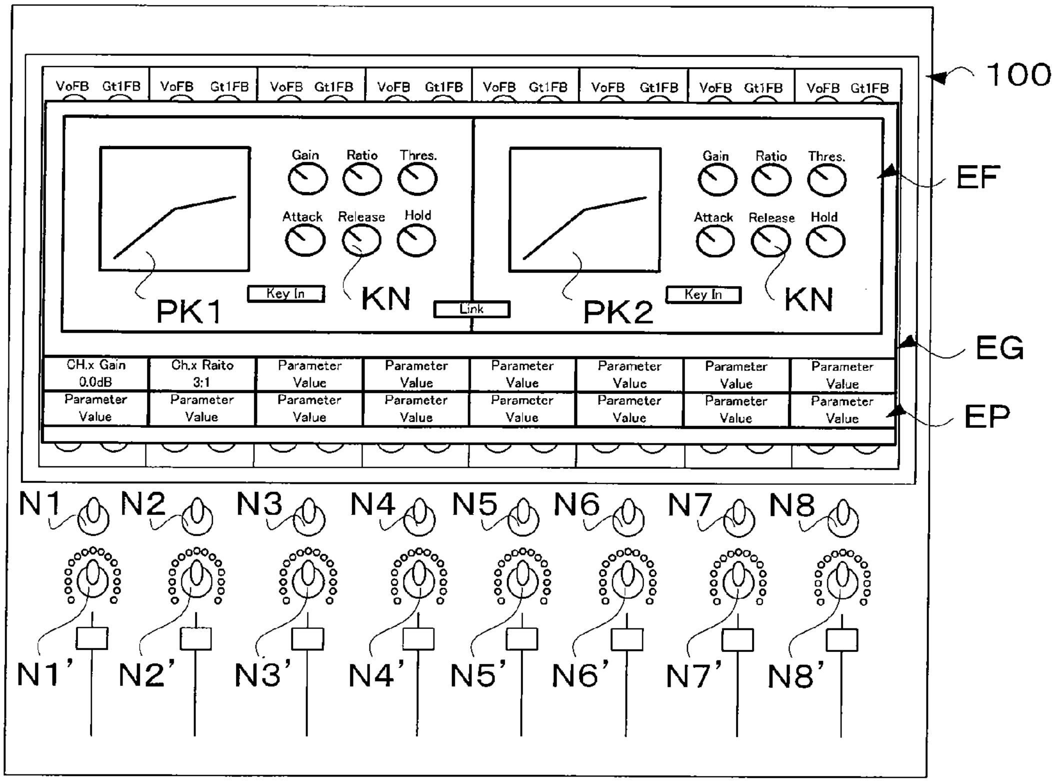
FIG. 4 is a conceptual diagram showing another example of the effect screen.

FIG. 4 is a conceptual diagram showing the effect screen of the different display type (“custom display type”).

The effect screen EG shown in FIG. 4 includes a parameter listing display area EP and an image display area EF. In the parameter listing display area EP, pieces of information (such as parameter names and parameter types) capable of indicating predetermined parameters, associated in advance with the assignable controls, i.e. main controls N1 to N8 and sub controls N1' to N8' on the basis of an assign table (not shown), are displayed near the assignable controls (lower portion of the effect screen EG in the illustrated example) and in a matrix format corresponding to the positional arrangement (or positions) of the assignable controls; namely, these effect parameters displayed in the matrix format are assigned to the main controls N1 to N8 and sub controls N1' to N8'.

In the image display area EF on the effect screen EG of FIG. 4, on the other hand, various pieces of information (PK1 and PK2), which would be influenced by parameters controlled through operation of any one of the physical knobs corresponding to the control images KN, may be displayed dividedly in left and right regions, in addition to the control images KN simulating the controls, in generally the same manner as on the effect screen EG of FIG. 4. However, it may be understood from the figures that, unlike on the screen of FIG. 3, control images KN corresponding to only selected ones, not all, of the main controls N1 to N8 and sub controls N1' to N8' are displayed in an appropriate arrangement on the screen of FIG. 4. Namely, on the effect screen EG shown in FIG. 4, display styles of the various pieces of information (PK1 and PK2) and control images KN, including the numbers, types, displayed positions, etc. of the pieces of information and control images KN to be displayed can be preset as desired. Thus, the display style of the effect screen shown in FIG. 4 is merely an illustrative example, and the present invention is not limited to the example of FIG. 4.

Namely, on the effect screen EG of FIG. 4, only selected (desired) ones, not all, of the control images KN simulating the main controls N1 to N8 and sub controls N1' to N8' are displayed on the screen, and these control images are displayed at desired positions rather than at positions corresponding to the actual positional arrangement (or positions) of the main controls N1 to N8 and sub controls N1' to N8'. Thus, the user can create an effect screen EG where only desired controls, for which the user considers always necessary to perform checking etc. of associated parameters, are arranged with a sufficient visibility. In such a case, the user can promptly check, per each of the controls for which the control images KN are displayed, the corresponding effect parameter by looking at the image display area EF; however, for each of the other controls for which no control images KN are displayed in the image display area EF, the user can not check the corresponding effect parameter promptly by looking at the image display area EF.

Thus, on the effect screen EG of FIG. 4, the listing of the effect parameters is displayed in the parameter listing display area EP in a matrix format separately from the image display area EF, so that the user is allowed to check the effect parameters corresponding to the other controls. In other words, by displaying the listing of the effect parameters in the matrix format, it becomes easier to modify the design of the image display area EF, taking into account usability and visibility for various possible users different in skill, without losing the checkability of the effect parameters associated with the individual controls. Needless to say, the instant embodiment may be arranged to allow the user itself to change as appropriate the design of the image display area EF (i.e., customize the design of the image display area EF). Also, the instant embodiment may be arranged to allow the user to change the fixed corresponding relationship between the controls and the effect parameters.

Figure 5:
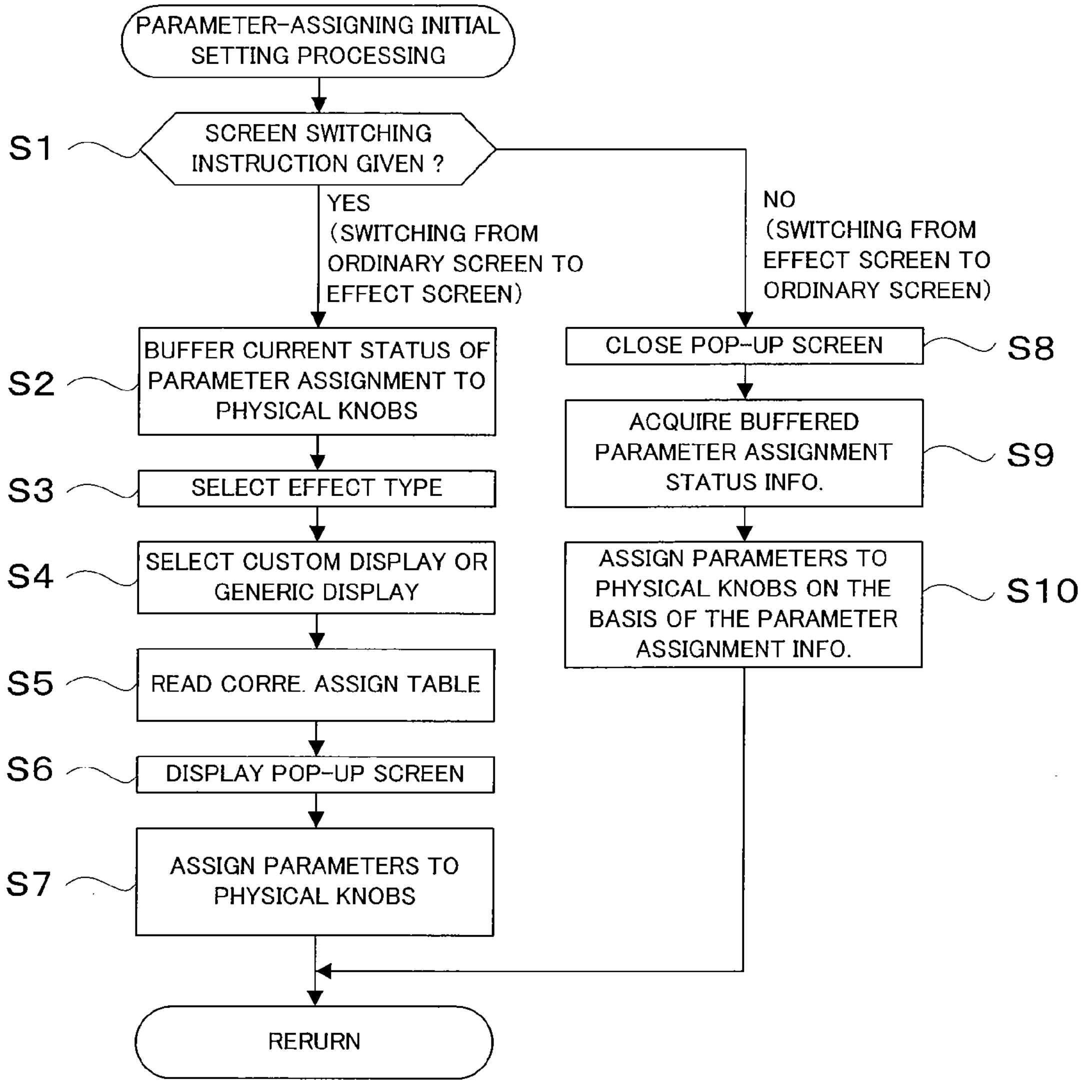
FIG. 5 is a flow chart showing an example of parameter-assigning processing performed in the embodiment of the present invention.

With reference to FIG. 5, the following describe parameter-assigning initial setting processing for effecting parameter assignment to the individual controls in response to each of the aforementioned screens being selectively displayed. FIG. 5 is a flow chart showing an example of the parameter-assigning processing. Note that a description about parameter assigning processing responsive to user’s parameter assigning operation using the parameter assigning screens C1-C8 is omitted here.

At step S1, a determination is made as to whether a screen switching instruction has been given for switching from the ordinary screen, displayed in accordance with an object to be controlled, over to the effect screen. If such a screen switching instruction has been given (YES determination at step S1), a current status of parameter assignment to the physical knobs (assignable controls) is stored into a buffer at step S2. At next step S3, an effect type is selected. At step S4, any one of the custom display type and generic display type is selected. Then, at step S5, an assign table prepared in advance is read in correspondence with the selected effect type and display type. At following step S6, the pop-up screen based on a display style corresponding to the selected display type, i.e. the effect screen of the display type shown in FIG. 3 or FIG. 4, is displayed. Then, at step S7, parameters are assigned to the corresponding physical knob on the basis of the read assign table, i.e. pop-up screen display.

If, on the other hand, a switching instruction has been given for switching from the effect screen, displayed in accordance with an object to be controlled, over to the ordinary screen (NO determination at step S1), the pop-up screen, i.e. effect screen, displayed at step S6 is closed at step S8. In response to the pop-up screen being closed like this, the parameter assign screens of FIG. 2, having been hidden behind the pop-up screen on the display device 100, are clearly displayed on the display device 100. Then, at step S9, the parameter assignment status information stored at step S2 above is acquired. At next step S10, parameters are assigned to the corresponding physical knobs on the basis of the acquired parameter assignment information, i.e. screen display.

Note that the assignable physical knobs provided per each of the channel strips are not limited to two physical knobs, i.e. one main control N1-N8 and one sub control N1'-N8', and may be three or more physical knobs.

Further, whereas the embodiment of the digital mixer has been described above in relation to the case where the effect screen is displayed as a pop-up screen to assign effect parameters to the assignable controls, the present invention is not so limited, the pop-up screen may be a screen intended for any other desired control than the effect control as long as the desired control is capable of controlling signals using a multiplicity of parameters. Furthermore, the effect screen may be displayed as a common screen switchable with a parameter assign screen, rather than as a pop-up screen.

The present application is based on, and claims priority to, JP PA. 2009-204858 filed on Sep. 4, 2009. The disclosure of the priority application, in its entirety, including the drawings, claims, and the specification thereof, is incorporated herein by reference.

What is claimed is:

1. A digital mixer for performing control on signals input for a plurality of channels and mixing the signals of desired ones of the channels to generate a mixed signal, said digital mixer comprising:

at least one main physical control and at least one sub physical control provided for one of the plurality of channels, a first desired parameter and a second desired parameter being assignable to the main and sub physical controls, respectively, for controlling the signal of the one channel associated with the physical controls;

a first display device;

a second display device;

an instruction section adapted for switching between screen displays;

a display control section adapted to perform a first display control for displaying a first predetermined screen and a second predetermined screen, each including at least a parameter display, on the first and second display devices, respectively; and a parameter assignment section which is adapted to assign one of a plurality of parameters included in the first predetermined screen, being displayed on said first display device, to the main physical control and is adapted to assign one of a plurality of parameters included in the second predetermined screen, being displayed on said second display device, to the sub physical control.

2. The digital mixer as claimed in claim 1, wherein the predetermined screen displayed on the first or second display device comprises a display of a plurality of parameters capable of being associated with the respective main or sub physical control of the predetermined screen, and the assignment of the respective main or sub physical control is changeable from one parameter to another parameter selected from among the plurality of parameters.

3. The digital mixer as claimed in claim 1, wherein the display control section is further adapted to perform, in response to an instruction for switching between screen displays given from said instruction section, a second display control for further displaying a predetermined parameter screen, including at least a parameter display, over the first predetermined screen being displayed on said first display device, and wherein the parameter assignment section is further adapted to assign a first parameter and a second parameter included in the parameter screen to the main and sub physical controls, respectively, when the parameter screen is displayed on said first display device.

4. The digital mixer as claimed in claim 3, wherein the parameter screen further displayable over the first predetermined screen on said first display device at least comprises control images simulative of selected ones of the main and sub physical controls to which are assignable parameters, and a parameter listing display having parameters, which are to be assigned to individual ones of the main and sub physical controls, displayed in a format in accordance with an actual positional arrangement, on the digital mixer, of the main and sub physical controls.

5. The digital mixer as claimed in claim 4, wherein the control images are simulative of the selected ones of the main and sub physical controls that are in a form of knobs, switches and/or buttons physically provided on the digital mixer.

6. The digital mixer as claimed in claim 4, wherein assignment, to the controls, of the parameters included in the parameter listing display is changeable by a user.

7. The digital mixer as claimed in claim 3, wherein the parameter screen is a pop-up screen.

8. A method for a digital mixer, the digital mixer for performing control on signals input for a plurality of channels and mixing the signals of desired ones of the channels to generate a mixed signal, said method comprising:

performing a first display control for displaying a first predetermined screen and a second predetermined screen, each including at least a parameter display, on first and second display devices, respectively;

assigning one of a plurality of parameters included in the first predetermined screen, being displayed on said first display device, to a main physical control of the digital mixer; and assigning one of a plurality of parameters included in the second predetermined screen, being displayed on said second display device, to a sub physical control of the digital mixer, wherein the main physical control and the sub physical control are provided for one of the plurality of channels, a first desired parameter and a second desired parameter being assignable to the main and sub physical controls, respectively, for controlling the signal of the one channel associated with the physical controls.

9. The method as claimed in claim 8, wherein the predetermined screen displayed on the first or second display device comprises a display of a plurality of parameters capable of being associated with the respective main or sub physical control of the predetermined screen, and the assignment of the respective main or sub physical control is changeable from one parameter to another parameter selected from among the plurality of parameters.

10. The method as claimed in claim 8, further comprising:

performing, in response to an instruction for switching between screen displays, a second display control for further displaying a predetermined parameter screen, including at least a parameter display, over the first predetermined screen being displayed on said first display device; and assigning a first parameter and a second parameter included in the parameter screen to the main and sub physical controls, respectively, when the parameter screen is displayed on said first display device.

11. The method as claimed in claim 10, wherein the parameter screen further displayable over the first predetermined screen on said first display device at least comprises control images simulative of selected ones of the main and sub physical controls to which are assignable parameters, and a parameter listing display having parameters, which are to be assigned to individual ones of the main and sub physical controls, displayed in a format in accordance with an actual positional arrangement, on the digital mixer, of the main and sub physical controls.

12. The method as claimed in claim 11, wherein the control images are simulative of the selected ones of the main and sub physical controls that are in a form of knobs, switches and/or buttons physically provided on the digital mixer.

13. The method as claimed in claim 11, wherein assignment, to the controls, of the parameters included in the parameter listing display is changeable by a user.

14. The method as claimed in claim 10, wherein the parameter screen is a pop-up screen.

* * * * *